United States Patent
Kim et al.

(10) Patent No.: US 9,605,182 B2
(45) Date of Patent: Mar. 28, 2017

(54) BASE MATERIAL COMPOSITION FOR BUBBLE-DISPERSIBLE FOAM TAPE, FOAM TAPE USING SAME, AND PREPARATION METHOD THEREOF

(71) Applicant: LG CHEM, LTD., Seoul (KR)

(72) Inventors: Ji-Hye Kim, Bucheon-si (KR); Seung-Min Yoo, Gunpo-si (KR); Jang-Soon Kim, Seongnam-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/395,356

(22) PCT Filed: Apr. 22, 2013

(86) PCT No.: PCT/KR2013/003389
§ 371 (c)(1),
(2) Date: Oct. 17, 2014

(87) PCT Pub. No.: WO2013/162230
PCT Pub. Date: Oct. 31, 2013

(65) Prior Publication Data
US 2015/0079303 A1    Mar. 19, 2015

(30) Foreign Application Priority Data

Apr. 24, 2012 (KR) .................... 10-2012-0042890

(51) Int. Cl.
*C09J 7/02*      (2006.01)
*C09J 4/00*      (2006.01)
(Continued)

(52) U.S. Cl.
CPC .............. *C09J 7/02* (2013.01); *C08F 220/18* (2013.01); *C08J 9/0061* (2013.01); *C08J 9/122* (2013.01);
(Continued)

(58) Field of Classification Search
CPC ....... C09J 4/00; C09J 7/02; C09J 11/00; C09J 133/04; C08J 9/0061; C08J 9/122; C08J 9/365
See application file for complete search history.

(56) References Cited

U.S. PATENT DOCUMENTS 5,070,168 A * 12/1991 O'Lenick, Jr. ....... C08G 77/388
                                                           427/387
5,753,735 A *  5/1998 Okoroafor ............ C08J 9/0023
                                                            516/34
(Continued)

FOREIGN PATENT DOCUMENTS

EP    2287263 A1    2/2011
JP    3161030 B2    4/2001
(Continued)

OTHER PUBLICATIONS

International Search Report for PCT/KR2013/003389 mailed on Aug. 9, 2013.
(Continued)

*Primary Examiner* — Shamim Ahmed
*Assistant Examiner* — Bradford Gates
(74) *Attorney, Agent, or Firm* — Hauptman Ham, LLP

(57) ABSTRACT

Disclosed are a base material composition for a foam tape which has high foam stability and excellent peel strength, a foam tape prepared using the same, and a preparation method thereof. According to the present invention, the base material composition for a foam tape comprises an acrylic monomer, a radical initiator, a cross-linking agent, a porous filler, and a surfactant, wherein the surfactant comprises 60-90 wt % of a siloxane-based polymer and 10-40 wt % of a non-siloxane-based polymer. A foam tape prepared thereby (Continued)

is economical compared with conventional foam tapes, is free from a deteriorating adhesive force, and has excellent foam stability.

5 Claims, 2 Drawing Sheets

(51) Int. Cl.
*C08J 9/00* (2006.01)
*C08J 9/12* (2006.01)
*C08J 9/36* (2006.01)
*C08F 220/18* (2006.01)

(52) U.S. Cl.
CPC .............. *C08J 9/365* (2013.01); *C09J 4/00* (2013.01); *C08J 2201/026* (2013.01); *C08J 2203/06* (2013.01); *C08J 2333/02* (2013.01); *C08J 2333/08* (2013.01); *C08J 2483/12* (2013.01); *C09J 2433/00* (2013.01); *C09J 2483/00* (2013.01)

(56) References Cited

U.S. PATENT DOCUMENTS

| | | | |
|---|---|---|---|
| 7,118,619 B2 * | 10/2006 | Brandt | B01F 17/0071 |
| | | | 106/31.6 |
| 2009/0075102 A1 * | 3/2009 | Brese | C25D 3/54 |
| | | | 428/457 |
| 2011/0315384 A1 | 12/2011 | Miquilena et al. | |

FOREIGN PATENT DOCUMENTS

| | | | |
|---|---|---|---|
| KR | 20000018221 A | | 4/2000 |
| KR | 20080013113 A | * | 2/2008 |
| KR | 20100010969 A | | 2/2010 |
| KR | 100957785 B1 | | 5/2010 |
| TW | 574094 B | | 2/2004 |
| WO | 0218511 A2 | | 3/2002 |

OTHER PUBLICATIONS

European extended search report dated Apr. 2, 2015 from EPO, in connection with the counterpart European Patent Application No. 13781831.6.
Taiwanese Office Action dated Dec. 22, 2014.

* cited by examiner

Fig. 2

| | Example1 | Comparative Example 1 | Comparative Example 2 | Comparative Example 3 |
|---|---|---|---|---|
| 1 min. | | | | |
| 3 min. | | | | |
| 5 min. | | | | |
| 7 min. | | | | |

US 9,605,182 B2

BASE MATERIAL COMPOSITION FOR BUBBLE-DISPERSIBLE FOAM TAPE, FOAM TAPE USING SAME, AND PREPARATION METHOD THEREOF

CROSS REFERENCE TO RELATED APPLICATION

This application claims the priority of Korean Patent Application No. 10-2012-0042890 filed on Apr. 24, 2012 in the Korean Patent and Trademark Office. Further, this application is the National Phase application of International Application No. PCT/KR2013/003389 filed on Apr. 22, 2013, which is incorporated herein by reference in its entirety.

TECHNICAL FIELD

The present invention relates to a base material composition for foam tapes and a foam tape prepared using the same, and more particularly, to a base material composition for foam tapes which uses an improved surfactant to facilitate bubble dispersion, a foam tape prepared using the base material composition, and a method for preparing the foam tape.

BACKGROUND ART

In the related art, Korean Patent Laid-open Publication No. 10-2000-18221 discloses an acrylic foam tape used for exterior decoration, such as interior design, garnish for automobiles, and the like, and a method for preparing the acrylic foam tape. A fluorine surfactant used in preparation of an existing bubble dispersed foam tape has a limit in use due to extremely high price and environmental regulations. In addition, since commercially available fluorine surfactants do not sufficiently stabilize bubbles in an acrylic adhesive, it is difficult to prepare an acrylic foam tape having a desired low-density.

Further, although an existing silicone surfactant includes high molecular weight polysiloxane and thus helps the foam tape to have bubble stability, there is a problem in that the silicone surfactant deteriorates adhesion of the finally prepared foam tape. This happens because a large number of siloxane groups included in the silicone surfactant can provide influence on the foam tape, such as deterioration in adhesion of a surface thereof, and other low molecular weight mixing components included in the silicone surfactant also have influence on adhesion of the foam tape.

Therefore, there is a need for a foam tape having competitive price and quality by introducing a silicone surfactant which exhibits high bubble stability and does not deteriorate adhesion of the foam tape.

DISCLOSURE

Technical Problem

The present invention is conceived to solve the above problems, and it is an aspect of the present invention to provide a foam tape exhibiting excellent bubble stability and adhesion.

Technical Solution

In accordance with one aspect of the present invention, a base material composition for foam tapes includes an acrylic monomer, a radical initiator, a crosslinking agent, a porous filler, and a surfactant, wherein the surfactant includes a silicone surfactant and an amine-based silicone compound.

Advantageous Effects

According to the present invention, the base material composition for foam tapes is prepared using an improved surfactant including a silicone surfactant and an amine-based silicone compound, thereby securing better bubble stability than existing foam tapes.

DESCRIPTION OF DRAWINGS

FIG. 2 is pictures showing evaluation results for bubble stability of foam tapes prepared in Examples and Comparative Examples.

BEST MODE

Figure 1:
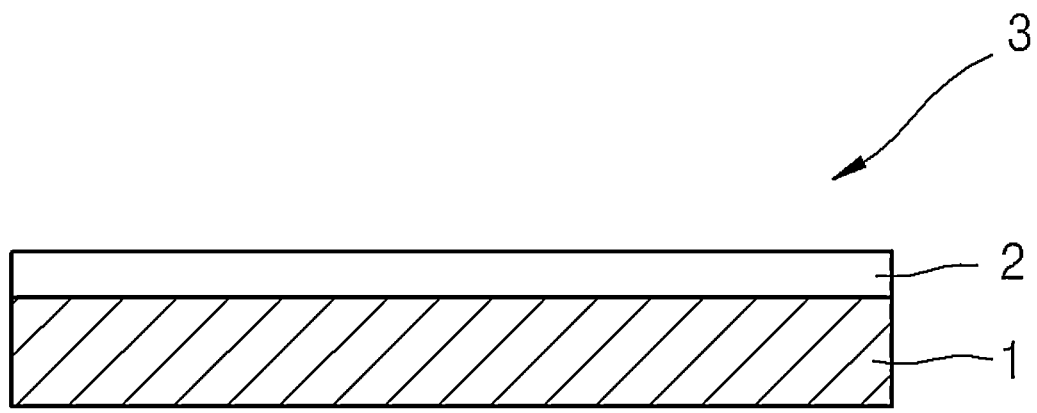
FIG. 1 is a sectional view of a structure of a foam tape according to one embodiment of the present invention.

The above and other aspects, features, and advantages of the present invention will become apparent from the detailed description of the following embodiments together with the accompanying drawings. However, it should be understood that the present invention is not limited to the following embodiments and may be embodied in different ways, and that the embodiments are provided for complete disclosure and thorough understanding of the present invention by those skilled in the art. The scope of the present invention is defined only by the accompanying claims and equivalents thereof. Like components will be denoted by like reference numerals throughout the specification.

Hereinafter, a base material composition for foam tapes, a foam tape using the base material composition and a method for preparing the foam tape according to embodiments of the present invention will be described in detail with reference to the accompanying drawings.

Base Material Composition for Foam Tapes

According to one embodiment of the invention, a base material composition for foam tapes includes an acrylic monomer, a radical initiator, a crosslinking agent, a porous filler, and a surfactant, wherein the surfactant includes a silicone surfactant and an amine-based silicone compound.

According to the present invention, the surfactant includes the amine-based silicone compound as an aid together with the silicone surfactant. The silicone surfactant according to the present invention may be a compound having a molecular weight from 100 to 30,000. When the silicone surfactant is used together with the amine-based compound as an aid rather than used alone, an amine group and acrylic acid have high reactivity with each other in the base material composition for foam tapes, whereby the high molecular-weight silicone surfactant is mixed well with an acrylic matrix. Thus, when the base material composition for foam tapes includes the amine-based silicone compound as an aid together with the silicone surfactant, there is a merit in that the base material composition for foam tapes exhibits superior bubble stability and adhesion to that including the silicone surfactant alone.

According to the present invention, the silicone surfactant and the amine-based silicone compound may be mixed in a ratio of 10:1 to 1:1 in the surfactant. If the amine-based silicone compound is present in an amount of less than the amount for forming the ratio of 10:1 in the surfactant, there is a problem in that the base material composition suffers from deterioration in bubble stability since the silicone surfactant is not mixed well with the acrylic matrix. In addition, if the amine-based silicone compound is present in an amount of greater than the amount for forming the ratio of 1:1 in the surfactant, there is a problem of an insignificant effect of the silicone surfactant. Preferably, the silicone surfactant and the amine-based silicone compound are mixed in a ratio of 4:1 in terms of bubble stability.

According to the present invention, the amine-based silicone compound used as an aid in the surfactant may be any silicone compound having an amine group without limitation. Preferably, the amine-based silicone compound is a compound including an amino-modified silicone-polyether copolymer. Examples of commercially available products of the amine-based silicone compound may include Magnasoft CJS, Magnasoft 310, Magnasoft 305, TSF4709, Mag-Plus (Momentive Co., Ltd.), and the like.

In addition, the silicone surfactant according to the present invention may be a silicone surfactant which includes a higher amount of a siloxane based polymer and a lower amount of a non-siloxane based polymer than existing surfactants. If a foam tape is prepared using the existing surfactant including a high amount of the non-siloxane based polymer, the non-siloxane based polymer moves to a surface of the tape and deteriorates adhesion of the tape. According to the present invention, the base material composition for foam tapes minimizes a problem due to deterioration in adhesion of the existing foam tape by reducing the amount of the non-siloxane based polymer, and exhibits excellent bubble stability by increasing the amount of the siloxane based polymer.

According to the present invention, the silicone surfactant includes 60% by weight (wt %) to 90 wt % of the siloxane based polymer, and 10 wt % to 40 wt % of the non-siloxane based polymer, as described above. If the siloxane based polymer is present in an amount of less than 60 wt %, it is difficult to secure sufficient bubble stability of the foam tape, and if the siloxane based polymer is present in an amount of greater than 90 wt %, the foam tape can suffer from deterioration in adhesion. In addition, if the non-siloxane based polymer is present in an amount of less than 10 wt %, there is a problem in that the foam tape does not obtain a sufficiently stable foam shape, and if the non-siloxane based polymer is present in an amount of greater than 40 wt %, the foam tape can suffer from deterioration in adhesion.

The siloxane based polymer refers to siloxane group-containing polymers, and may be polyalkyleneoxide-modified polydimethylsiloxane. The polyalkyleneoxide-modified polydimethylsiloxane may have a block copolymer form. The polyalkyleneoxide-modified polydimethylsiloxane may have a structure in which linear polydimethylsiloxane includes branched polyalkyleneoxide, or a structure in which a polyalkyleneoxide group is placed at an end of a silicone backbone.

In addition, the non-siloxane based polymer may be a polyalkyleneoxide.

According to the present invention, the acrylic monomer serves to improve adhesion and cohesion of the foam tape, and may include at least one selected from the group consisting of butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, acrylic acid, methacrylic acid, maleic acid, fumaric acid, acrylamide, N-vinyl pyrrolidone, N-vinyl caprolactam, and acrylonitrile.

The acrylic monomer may include a mixture of a soft acrylate monomer, such as butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate and isononyl methacrylate, and a hard acrylate monomer, such as acrylic acid, methacrylic acid, maleic acid, fumaric acid, acrylamide, N-vinyl pyrrolidone, N-vinyl caprolactam and acrylonitrile. The acrylic monomer may include 80 parts by weight to 99 parts by weight of the soft acrylic monomer, and 1 part by weight to 20 parts by weight of the hard acrylic monomer.

According to the present invention, the radical initiator is used in polymerization of the acrylic monomer, and may be selected from among commercially available initiators. More particularly, the radical initiator may be a mixture of a thermal initiator and a photoinitiator. Since polymerization by the photoinitiator can exhibit low polymerization efficiency, the photoinitiator may be mixed with the thermal initiator, thereby adjusting molecular weight and viscosity of a polymer within a desired range. The photoinitiator may include benzoin methyl ether, benzoin isopropyl ether, anisoin methyl ether, benzoin, benzyl ketal, and the like. In addition, the thermal initiator may include peroxide thermal initiators including benzoyl peroxide, azobisisobutyronitrile, and amine thermal initiators. The thermal initiator and the photoinitiator may be any initiator which is used by those skilled in the art and is commercially available.

According to the invention, the crosslinking agent serves to reinforce initial adhesion of the foam tape through crosslinking between acrylic polymers in the process of polymerization of the acrylic monomer and in the process of exhibition of adhesion of an adhesive. The crosslinking agent may include photo crosslinking agents, thermal crosslinking agents, and mixtures thereof. For example, the crosslinking agent may include: diacrylate crosslinking agents including hexanediol diacrylate, ethylene glycol diacrylate, diethylene glycol diacrylate, triethylene glycol diacrylate, propylene glycol diacrylate, dipropylene glycol diacrylate, tripropylene diacrylate and the like; triacrylate crosslinking agents; aziridine crosslinking agents; epoxy crosslinking agents, and the like. The crosslinking agent may also be any crosslinking agent which is used by those skilled in the art and is commercially available.

The porous filler may include thermally expandable resins such as polymeric sphere Expancel 551DU™ and the like, glass Macroballon™, glass bubbles, and the like. The porous filler serves to form a large number of pores in the foam tape through expansion thereof by heat upon polymerization of the acrylic monomer. The glass macroballoon is typically used in the art, and may have a hollow spherical shape in order to efficiently absorb noise.

In addition, the base material composition for foam tapes may further include an additive selected from the group consisting of tackifiers, coupling agents, antistatic agents, dyes, pigments, UV blocking agents, antioxidants, processing oils, and mixtures thereof.

The tackifier serves to improve initial adhesion of the foam tape. The tackifier may include at least one selected from among rosin ester, rosin, terpene, and petroleum resin tackifiers.

After the foam tape according to the present invention is used in attachment between adherends, and the like, since the coupling agent promotes crosslinking of the acrylic polymer included in the base material composition upon exposure to heat, sunlight, temperature and the like under ambient conditions, and thus allows a three-dimensional network to be formed, the coupling agent serves to allow the foam tape to exhibit permanent adhesion. The coupling agent may be a mixture of amine silanes and epoxy silanes.

The antistatic agent serves to prevent an adherend to which the foam tape is applied from accumulating static charge. The antistatic agent may be an antistatic agent known in the art.

Further, the base material composition for foam tapes may include the processing oil to improve cold resistance. The processing oil may include diisobutyl phthalate (DIBP), dioctyl phthalate (DOP), allyl ethers, paraffin oil, naphthalene oil, and the like, without being limited thereto.

According to the present invention, the base material composition may further include dyes, pigments, UV blocking agents, antioxidants and the like so long as the base material composition maintains properties thereof. In addition, an amount thereof may vary with desired properties of a final product.

According to the present invention, the base material composition for foam tapes may include 0.1 parts by weight to 5 parts by weight of the radical initiator, 0.01 parts by weight to 5 parts by weight of the crosslinking agent, 1 part by weight to 10 parts by weight of the porous filler, and 0.1 parts by weight to 5 parts by weight of the surfactant, based on 100 parts by weight of the acrylic monomer.

In the base material composition for foam tapes, if the radical initiator is present in an amount of less than 0.1 parts by weight, there can be a problem of an unreacted monomer, and if the radical initiator is present in an amount of greater than 5 parts by weight, there can be a problem of reduction in molecular weight of the polymer.

In the base material composition for foam tapes, if the crosslinking agent is present in an amount of less than 0.01 parts by weight, the foam tape can suffer from deterioration in cohesion or weather resistance. Conversely, if the crosslinking agent is present in an amount of greater than 5 parts by weight, the foam tape can suffer from deterioration in initial adhesion and adhesive properties.

In the base material composition for foam tapes, if the porous filler is present in an amount of less than 1 part by weight, the foam tape can suffer from deterioration in prevention of noise. Conversely, if the porous filler is present in an amount of greater than 10 parts by weight, the foam tape can suffer from deterioration in adhesion due to excess filler.

In the base material composition for foam tapes, if the surfactant is present in an amount of less than 0.1 parts by weight, there can be a problem of residual bubbles in the foam tape. Conversely, if the surfactant is present in an amount of greater than 5 parts by weight, the foam tape can suffer from deterioration in cohesion and durability.

Method for Preparing Foam Tape

According to one embodiment of the invention, a method for preparing a foam tape includes: (a) preparing a base material composition by mixing an acrylic monomer, a radical initiator, a crosslinking agent, a porous filler, and a surfactant in which a silicone surfactant including 60 wt % to 90 wt % of a siloxane based polymer and 10 wt % to 40 wt % of a non-siloxane based polymer is mixed with an amine-based silicone compound in a ratio of 5:1 to 2:1; (b) coating the base material composition onto a backing film; and (c) forming a foam tape by simultaneously performing polymerization and foam formation by curing the backing film coated with the base material composition through a UV curing apparatus.

In operation (a), the base material composition of the foam tape is prepared by mixing the acrylic monomer, the radical initiator, the crosslinking agent, the porous filler, and the surfactant in which the silicone surfactant including 60 wt % to 90 wt % of the siloxane based polymer and 10 wt % to 40 wt % of the non-siloxane based polymer is mixed with the amine-based silicone compound in a ratio of 5:1 to 2:1.

In operation (b), the base material composition obtained in operation (a) is coated onto the backing film. The backing film serves to support the base material composition while the base material composition is polymerized to form an adhesive material. The backing film may be a typical PET release film. In addition, coating may be performed using a typical coater.

In operation (c), foam formation and polymerization are simultaneously performed by simultaneously performing UV irradiation (10 W to 60 W) and heating (100° C. to 180° C.) of the backing film coated with the base material composition in operation (b) through the UV curing apparatus. UV irradiation may be performed at a power from 10 W to 60 W, and heating may be performed at a temperature from 100° C. to 180° C. In operation (c) of forming a foam tape, polymerization may be performed under typical polymerization conditions, particularly, under conditions for polymerization of the acrylic monomer into an acrylic polymer. Although the present invention is not limited to the above polymerization conditions, polymerization by the thermal initiator may be performed at a temperature from 60° C. to 120° C. in an oven for 2 minutes to 3 minutes for efficiency of the initiator.

Foam Tape

Through the above processes, the foam tape according to the present invention can be prepared. As shown in FIG. 1, a foam tape 3 prepared through the above processes has a structure including a foam layer 1 formed of the base material composition, and a backing film 2 supporting the foam layer.

Hereinafter, the present invention will be explained in more detail with reference to some examples. However, it should be understood that these examples are not to be in any way construed as limiting the present invention.

Example 1

90 parts by weight of 2-ethylhexyl acrylate and 10 parts by weight of a polar acrylic acid monomer were subjected to thermal polymerization in a 1 L glass reactor, thereby obtaining a syrup having a viscosity of 3500 cP. Next, 0.5 parts by weight of Irgacure-651 (α,α-methoxy-α-hydroxyacetophenone) as a photoinitiator, and 0.35 parts by weight of 1,6-hexanediol diacrylate (HDDA) as a crosslinking agent were mixed based on 100 parts by weight of the obtained syrup, followed by sufficient stirring. Next, 4.5 parts by weight of glass bubbles and 1.5 parts by weight of silica were mixed with the syrup, followed by sufficient stirring until the components were uniformly mixed. The mixture was subjected to vacuum degassing using a vacuum pump.

Next, the mixture and 2 parts by weight of a surfactant, in which a silicone surfactant (80 wt % of a siloxane polyalkyleneoxide copolymer/20 wt % of a non-siloxane based polymer) and an amine-based silicone compound (a compound including an amino-modified silicone-polyether copolymer) were mixed in a ratio of 4:1, were coated to a thickness of 1 mm onto a release film using a frother while nitrogen gas was injected, followed by preparing an acrylic foam tape through a UV curing apparatus.

Example 2

An acrylic foam tape was prepared in the same manner as in Example 1 except that a surfactant, in which the silicone surfactant (80 wt % of a siloxane polyalkyleneoxide copolymer/20 wt % of a non-siloxane based polymer) and the amine-based silicone compound (a compound including an amino-modified silicone-polyether copolymer) were mixed in a ratio of 10:1, was used.

Example 3

An acrylic foam tape was prepared in the same manner as in Example 1 except that a surfactant, in which the silicone surfactant (80 wt % of a siloxane polyalkyleneoxide copolymer/20 wt % of a non-siloxane based polymer) and the amine-based silicone compound (a compound including an amino-modified silicone-polyether copolymer) were mixed in a ratio of 1:1, was used.

Comparative Example 1

An acrylic foam tape was prepared in the same manner as in Example 1 except that a silicone surfactant including 80 wt % of a siloxane polyalkyleneoxide copolymer and 20 wt % of a non-siloxane based polymer was used alone as the surfactant in an amount of 2 parts by weight.

Comparative Example 2

An acrylic foam tape was prepared in the same manner as in Example 2 except that a silicone surfactant (SH192, Dow Corning Toray Co., Ltd.) including 50 wt % of a dimethyl methyl propyl siloxane copolymer and 50 wt % of a non-siloxane based polymer was used.

Comparative Example 3

An acrylic foam tape was prepared in the same manner as in Example 2 except that a fluorine surfactant (FC-4430, 3M Co., Ltd.) was used instead of the silicone surfactant.

[Property Evaluation]
1) Bubble Stability

Under the same work conditions as coating conditions (injection of nitrogen gas into an adhesive composition, and introduction of a surfactant thereto), an ejection liquid was poured into a paper cup, followed by photographing with a digital camera for observation of bubble increase and bubble size over time using a stopwatch.

2) 180° Peel Strength

An ABS plate, a chrome plate, a painted plate (standard painted plate for peel strength measurement) and a polycarbonate (PC) plate, which had a width of 50 mm and a length of 120 mm, were cleaned with an isopropyl alcohol solution, followed by drying. A PET film having a thickness of 0.038 mm and a width of 30 mm was laminated on one surface of each of the acrylic foam tapes so as to form a cover, thereby preparing a specimen. The prepared specimen was bonded to each of the ABS, chrome, painted, and PC plates, followed by rolling 5 times in each direction using a 2 kg roller, thereby preparing a sample for peel strength.

The prepared sample was left at room temperature for 30 minutes and for 24 hours. Next, 180° peel strength was measured on the sample at room temperature at a speed of 300 mm/min, and an average value of 5 samples was recorded.

[Results of Property Evaluation]
1) Bubble Stability

Results of bubble stability are shown in FIG. 2. Referring to FIG. 2, most bubbles leaked out to a surface after 7 minutes. However, it can be seen that the foam tapes of Examples 1 to 3 according to the present invention scarcely suffered from bubble leakage to the surface thereof after 5 minutes, as compared with the foam tapes of Comparative Examples. That is, it can be seen that the foam tapes of Examples 1 to 3 according to the present invention exhibit excellent bubble stability within an acrylic adhesive.

2) Peel Strength

TABLE 1

| | | Peel strength (g/inch) | | | |
|---|---|---|---|---|---|
| | Standing time | Painted surface | Chrome surface | ABS | PC |
| Example 1 | 30 minutes | 2970 | 2123 | 3166 | 1276 |
| | 24 hours | 3461 | Backing separation | 1276 | 1793 |
| Example 2 | 30 minutes | 2966 | 2130 | 3198 | 1282 |
| | 24 hours | 3455 | Backing separation | 1288 | 1802 |
| Example 3 | 30 minutes | 2980 | 2135 | 3210 | 1288 |
| | 24 hours | 3488 | Backing separation | 1293 | 1811 |
| Comparative Example 1 | 30 minutes | 2796 | 2594 | 3435 | 4126 |
| | 24 hours | 3077 | Backing separation | 3475 | 1658 |
| Comparative Example 2 | 30 minutes | 2630 | 2298 | 1931 | 653 |
| | 24 hours | 3054 | Backing separation | 2450 | 1033 |
| Comparative Example 3 | 30 minutes | 2484 | 2074 | 2197 | 1502 |
| | 24 hours | 2986 | Backing separation | 2625 | 1852 |

Evaluation results of peel strength are shown in Table 1. Referring to Table 1, the foam tape of Comparative Example 2 using an existing silicone surfactant alone exhibited low peel strength on most substrates, and exhibited extremely low peel strength particularly on the PC surface. (However, referring to the evaluation results of peel strength on the chrome surface after the foam tape was left for 24 hours, the PET backing film was separated while the adhesive tape was broken due to high adhesion in all cases of Examples and Comparative Examples). It is believed that other mixtures in the surfactant affected the surface of the foam tape of Comparative Example 2 to deteriorate peel strength.

The foam tape of Example 1 according to the present invention had almost the same peel strength as those of Comparative Examples 1 and 3. Therefore, it could be seen that the foam tape of Example 1 according to the present invention exhibited excellent bubble stability and peel strength as well.

The invention claimed is:

1. A base material composition for foam tapes comprising:
    an acrylic monomer, a radical initiator, a crosslinking agent, a porous filler, and a surfactant, wherein
    the surfactant comprises a silicone surfactant having a molecular weight from 100 to 30,000 and an amine-based silicone compound, and the silicone surfactant and the amine-based silicone compound are presented in a ratio of 10:1 to 1:1,
    the amine-based silicone compound comprises an amino-modified silicone-polyether copolymer, the silicone surfactant comprises 80 wt % of a siloxane based polymer and 20 wt % of a non-siloxane based polymer, wherein the siloxane based polymer is a polyalkyleneoxide-modified polydimethylsiloxane, and the non-siloxane based polymer is a polyalkyleneoxide, and the surfactant is presented in an amount of 0.1 parts by weight to 5 parts by weight, based on 100 parts by weight of the acrylic monomer.

2. The base material composition according to claim 1, further comprising:

an additive selected from the group consisting of tackifiers, coupling agents, antistatic agents, dyes, pigments, UV blocking agents, antioxidants, processing oils, and mixtures thereof.

3. The base material composition according to claim 1, wherein the acrylic monomer comprises at least one selected from the group consisting of butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, acrylic acid, methacrylic acid, maleic acid, fumaric acid, acrylamide, N-vinyl pyrrolidone, N-vinyl caprolactam, and acrylonitrile.

4. The base material composition according to claim 1, comprising:

0.1 parts by weight to 5 parts by weight of the radical initiator, 0.01 parts by weight to 5 parts by weight of the crosslinking agent, and 1 parts by weight to 10 parts by weight of the porous filler based on 100 parts by weight of the acrylic monomer.

5. The base material composition according to claim 1, further comprising a processing oil comprising diisobutyl phthalate (DIBP), dioctyl phthalate (DOP), allyl ethers, paraffin oil, naphthalene oil, and combinations thereof.

* * * * *